(12) United States Patent
Zhou

(10) Patent No.: US 8,827,572 B2
(45) Date of Patent: Sep. 9, 2014

(54) SIDE COUPLING OPTICAL FIBER ASSEMBLY AND FABRICATION METHOD THEREOF

(75) Inventor: Dan Zhou, Wuhan (CN)

(73) Assignee: Wuhan Telecommunication Devices Co., Ltd., Wuhan (CN)

( * ) Notice: Subject to any disclaimer, the term of this patent is extended or adjusted under 35 U.S.C. 154(b) by 321 days.

(21) Appl. No.: 13/255,870

(22) PCT Filed: Feb. 4, 2010

(86) PCT No.: PCT/CN2010/070505
§ 371 (c)(1),
(2), (4) Date: Sep. 9, 2011

(87) PCT Pub. No.: WO2010/108399
PCT Pub. Date: Sep. 30, 2010

(65) Prior Publication Data
US 2012/0020621 A1    Jan. 26, 2012

(30) Foreign Application Priority Data
Mar. 26, 2009   (CN) .......................... 2009 1 0130017

(51) Int. Cl.
*G02B 6/42* (2006.01)
*G02B 6/36* (2006.01)

(52) U.S. Cl.
CPC ............ *G02B 6/4214* (2013.01); *G02B 6/3636* (2013.01); *G02B 6/4206* (2013.01); *G02B 6/423* (2013.01)
USPC ................................. 385/88; 385/31; 385/39

(58) Field of Classification Search
None
See application file for complete search history.

(56) References Cited

U.S. PATENT DOCUMENTS

| 4,130,343 | A | * | 12/1978 | Miller et al. ..................... 385/49 |
| 5,497,438 | A | * | 3/1996 | Ishikawa et al. ................. 385/38 |
| 6,389,202 | B1 | * | 5/2002 | Delpiano et al. ................. 385/49 |
| 6,869,229 | B2 | * | 3/2005 | Reedy et al. ..................... 385/88 |
| 2005/0018974 | A1 | * | 1/2005 | Rolston et al. .................. 385/83 |
| 2010/0061683 | A1 | * | 3/2010 | Sasaki ............................. 385/88 |

FOREIGN PATENT DOCUMENTS

| CN | 1578920 | 2/2005 |
| CN | 1977200 | 6/2007 |
| CN | 101226261 | 7/2008 |
| CN | 101393306 | 3/2009 |
| CN | 101520530 | 9/2009 |
| JP | 2006-10891 | 1/2006 |
| WO | WO2007/139316 | 12/2007 |

* cited by examiner

*Primary Examiner* — Mike Stahl
(74) *Attorney, Agent, or Firm* — Workman Nydegger

(57) ABSTRACT

A side-coupling optical fiber assembly comprises a first substrate (200), on a surface of which at least one concave groove is provided; an optical fiber (210) disposed in the concave groove; and a second substrate (220) disposed on the first substrate (200) and pressed on the optical fiber (210). The end of the optical fiber (210) between the first substrate (200) and the second substrate (220) is set as a slant surface (240), which is used for performing total reflection for the light beam transmitted in the optical fiber (210). A method for making the side-coupling optical fiber assembly is provided.

8 Claims, 4 Drawing Sheets

US 8,827,572 B2

SIDE COUPLING OPTICAL FIBER ASSEMBLY AND FABRICATION METHOD THEREOF

CROSS-REFERENCE TO RELATED APPLICATIONS

This application is a U.S. Nationalization of PCT International Application No. PCT/CN2010/070505 filed Feb. 4, 2010, entitled "LATERALLY COUPLED OPTICAL FIBER COMPONENT AND PROCESSING METHOD THEREOF," which claims priority to Chinese Patent Application No. 200910130017.8 filed Mar. 26, 2009, the entireties of both of the foregoing applications are incorporated herein by reference.

TECHNICAL FIELD

This invention relates to an optical packaging technology for optoelectronic devices. More specifically, this invention relates to a side-coupling optical fiber unit for fiber packaging of semiconductor optoelectronic devices and a fabrication method thereof in the field of fiber optic communication.

BACKGROUND

For optoelectronic devices applied to transmitting or receiving optical signals or energies, much optical transmission between the device and the outside needs be realized through optical fibers (or in short "fibers" hereof), therefore, an optical coupling issue exists in these optoelectronic devices between a photoelectric conversion element, which is the key part of the device, and the optical fiber. This is called the fiber packaging of the optoelectronic devices.

Please refer to FIG. 1, which shows the working principle of the side-coupling optical fiber unit from under the prior art. That is, the input and the output of the light beam at the end of the optical fiber is not along the axial direction of the fiber but the radial direction, i.e., at a right angle to the fiber axis. The side coupling is realized through an inclined end facet formed on the optical fiber end 140, which satisfies a total-internal-reflection condition. The side-coupling structure is normally used in coupling of an optical fiber to a surface-type photoelectric conversion element 100 under a certain packaging mode, more commonly seen as between an optical fiber 110 and a surface-type semiconductor optical-receiver chip in a butterfly package.

Please refer to FIG. 2, which illustrates the typical embodiment of the above side-coupling optical fiber unit in the prior art. The fixing of the fiber 110 at a spatial position is realized through a generally metallic package 150 that contains the photoelectric conversion element 100. A circular through-hole 160 for passing the fiber is arranged in the package 150, and a certain section of the fiber 110 is fixed in the through-hole 160. A typical fixation process is to tightly attach a metal sleeve layer 170 to a naked fiber 110, whose outer protective materials have been removed, and to solder the fiber 110 with the attached metal sleeve layer 170 into the through-hole 160 by metallic solders, wherein the process forms an airtight and stable packaging.

In the side-coupling structure of the prior art, the optical fiber needs be placed above the surface-type photoelectric conversion element, due to the following two main reasons:

(1) The structure that the working (coupling) surface of the photoelectric conversion element is being upward and the fiber end is above the working surface is easy for observation and alignment. The effective working region of the working surface of the photoelectric conversion element is generally a limited round region 120 circled by a metallic ring electrode 130 (as shown in FIG. 1). The observation and the alignment are handled under a microscope.

(2) The lead electrode 130 of the photoelectric conversion element is generally situated on the same surface of the working surface of the element (as shown in FIG. 1), and electrical connections between this lead electrode and the electrode of the mounting substrate of the element, between electrodes of all elements, and between an electrode of an element and the package frame, are generally realized through wire bonds, the wire being generally an ultrathin gold wire and the bonds formed by professional wire bonding machines, wherein the wire bonding process requires that each electrode surface be in an upward position. This necessitates also the upward positioning of the working surface of the photoelectric conversion element.

In the prior art, although the structure that the optical fiber is positioned above the photoelectric conversion element is easy for observation and alignment, a stability issue of the fiber fixation comes into existence due to the way of fiber fixing. The problem begins to show up when the working region of the photoelectric conversion element becomes very small. For a semiconductor optoelectronic chip used in the optical receiving in the optical communication, the size of the working region directly affects the working speed of the chip, as the higher the speed, the smaller a designed working region is to be needed. In the prior art, for the fiber fixing is not directly made to the fiber end but to a certain limited section some distance away from it, the fiber end can have quite a large spatial freedom. Particularly, for a slight angle of tilting of the fixed section, a relatively large displacement can occur at the fiber end. Moreover, the fiber fixing utilizes metallic elements which are in nature with large thermal expansion and contraction effects, including the unevenly distributed metallic solder materials, wherein this metalized, soldering process is needed for an airtight packaging. Hence, the fiber end is easy to drift away from its original optimal coupling position, for a slight movement of the fixed section of the fiber resulting from stress variation in the soldering part due to such as the temperature change, which then leads to device performance degradation or even fail.

At the unit channel speed reaching 10 G (1 G=$10^9$) bits per second applied in current optical communication systems, the diameter of the working region of a semiconductor optoelectronic chip for the optical receiving has shrank to as small as 30 μm. As the speed increases to the next grade of 40 G, the diameter will further decrease to 12 μm, whereas the diameter of the light beam propagated in a conventional single-mode fiber is already about 10 μm. Therefore, with the increase of the speed, the optical coupling becomes more and more sensitive to the position shift of the fiber. In current 10 G-dominated industrial product developments and production practices, problems out of this coupling instability such as reliability hard to be achieved, low primary qualification rate, and too long manufacturing time have already been in existence, making a production difficult to enter high volume, together with a high cost.

On the other side, while the speed goes up to higher grades, requirements on the electrical packaging of the optoelectronic devices also grow. The impeding and parasitic effects brought by the bonding wire on high-frequency electrical signals become stronger with the increase of signal frequency, and to a certain stage the performance becomes remarkably deteriorated. In theory, the situation of frequency upgrade can be accommodated by reducing the wire length. However, due to limitation of the wire bonding process wherein the wire length can not be decreased permanently, when the signal wire reaches as short as 100 μm, the employing of the wire bonding technology becomes quite difficult. This situation basically corresponds to a wire length requirement when the speed reaches 40 Gb/s.

An effective solution is to adopt the flip-chip mounting technology, wherein the lead electrode of a chip element faces downward and is directly bonded to the electrical circuit on the submount or substrate by such as a commonly used soldering method with some solder materials. As such, the connection lengths are made at a minimum, and thereby it is able to meet the high-speed requirement. Meanwhile, the flip-chip structure also provides advantages as improvement in heat dissipation, increase of electrical connection density, etc. The flip-chip mounting is already an established process in the microelectronics field. As for an optoelectronic element, a main type being that the lead electrode and the working surface for the optical coupling are on the same surface, if the flip-chip technology is to be adopted, the working surface will need be positioned downward, which is incompatible with the conventional fiber packaging technology. Since the positioning and the fixing of the optical fiber are done with the through-hole structure of the package in the prior art, all fiber coupling processes need rely on this package. This makes the coupling of the optical fiber placed below a photoelectric conversion element whose working surface is positioned downward difficult to conduct, for the fiber is invisible in manipulation. As a result, the current fiber packaging technology has restricted the implementation of the flip-chip technology which otherwise could be adopted in many optoelectronic devices.

Invention Contents

This invention aims to provide a side-coupling optical fiber assembly and the fabrication method thereof for overcoming the defects described above in the prior art.

For this purpose, the invention first provides a side-coupling optical fiber assembly that comprises a first substrate, an optical fiber, and a second substrate, wherein at least one groove is formed on one surface of the first substrate, the optical fiber is arranged in the groove, and the second substrate is arranged above the first substrate, pressing and covering the optical fiber.

Among them, an inclined facet is formed on the fiber end positioned between the first and the second substrates. The inclined facet is to realize a total internal reflection of the light beam transmitted in the optical fiber.

The first and the second substrates are fixed together to ensure that the optical fiber between them loses all its degrees of freedom.

Preferably, one end edge facet of each of the first and the second substrates is in the same surface of the inclined end facet of the optical fiber.

A first light-passing hole is arranged in the second substrate, corresponding to the path of the light beam after it is totally reflected from the inclined end facet of the optical fiber; or, this second substrate is made of an identical or similar material as that of the waveguide of the optical fiber for reducing the internal reflection.

Preferably, the second substrate is an extended optical bench, and at least one optical element is installed on it.

The optical element installed on the second substrate can be a lens, and the transmission region of the lens corresponds to the projection region of the totally reflected light beam.

Preferably, the side-coupling optical fiber assembly includes a spacer plate. The spacer plate is arranged above the second substrate. A slot hole is arranged in the spacer plate and the lens is adapted to the slot hole.

Preferably, the side-coupling optical fiber assembly includes a mounting substrate of an optical receiving chip, a second light-passing hole, and an optical receiving chip, wherein the mounting substrate is arranged above the spacer plate, the second light-passing hole is arranged in the mounting substrate and corresponds to the projection region of the light beam after through the lens, and the optical receiving chip is arranged above the second light-passing hole and is combined with the mounting substrate.

Second, the invention provides a fabrication method of the side-coupling optical fiber assembly, which comprises the following steps:

an optical fiber is put into a groove formed on a first substrate;

the first substrate and a second substrate are fixed together by means of adhesion, which makes the optical fiber lose all its degrees of freedom;

the end face of the optical fiber and the end edge faces of the first and the second substrates are ground or polished into one same inclined surface, wherein a total internal reflection of the light beam in the optical fiber takes place at the formed inclined end facet of the fiber.

In accordance, there's a step to keep the first and the second substrates in a horizontal position after they are fixed together, as follows:

at least one additional optical fiber having the same diameter as the aforementioned optical fiber is put into another groove of the first substrate, after which the first and the second substrates are fixed together.

In comparison with the prior art, this invention has the following advantages:

first, as a side-coupling optical fiber unit, it provides a direct and complete confinement of the coupling optical fiber end, and in combination with a mounting substrate of the photoelectric conversion element, it is able to realize a stable and reliable lateral fiber coupling under rigorous requirements;

second, the side-coupling optical fiber assembly of the invention is flexible in installation, and it's convenient for accommodating various kinds of packaging technologies including the flip-chip mounting;

last, the side-coupling optical fiber assembly of the invention can provide a new assembling platform, upon which it can be extended to a function-versatile, all-in-one side-coupling optical fiber assembly including being implemented as a complete element mounting platform.

DETAILED DESCRIPTION

With the drawings, the above and other technical features and advantages of the invention are further detailed below.

Figure 1:
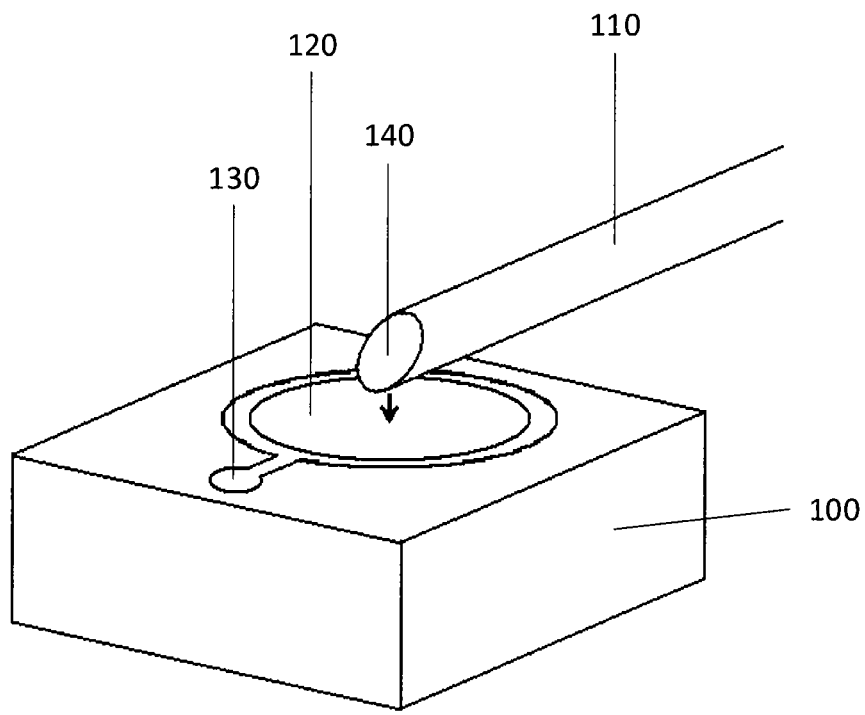
FIG. 1 is a perspective view showing the working principle of the side-coupling optical fiber unit from under the prior art.
Figure 2:
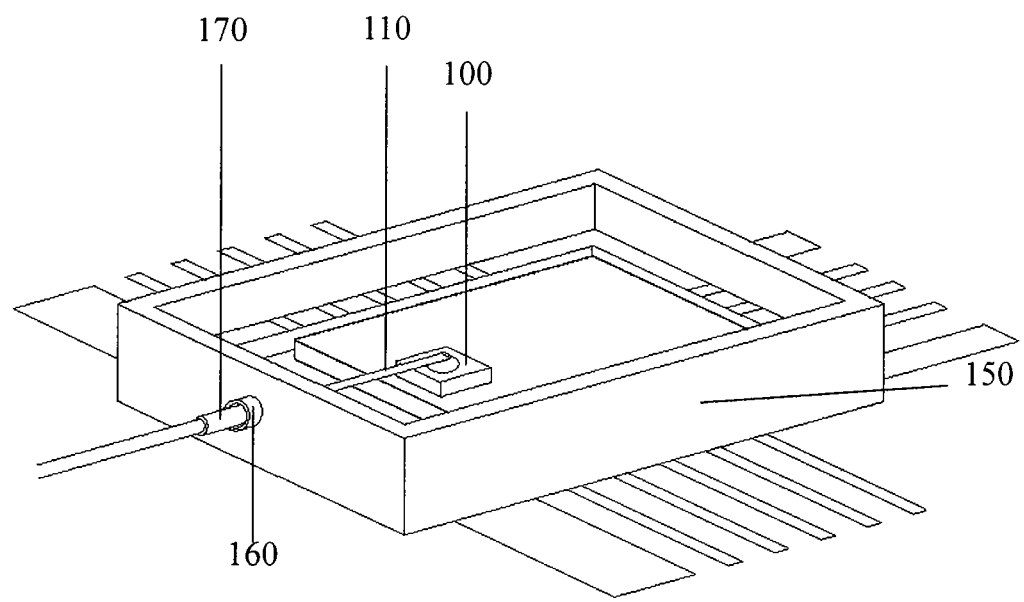
FIG. 2 is a perspective view of the embodiment of the side-coupling optical fiber unit of the prior art.
Figure 3:
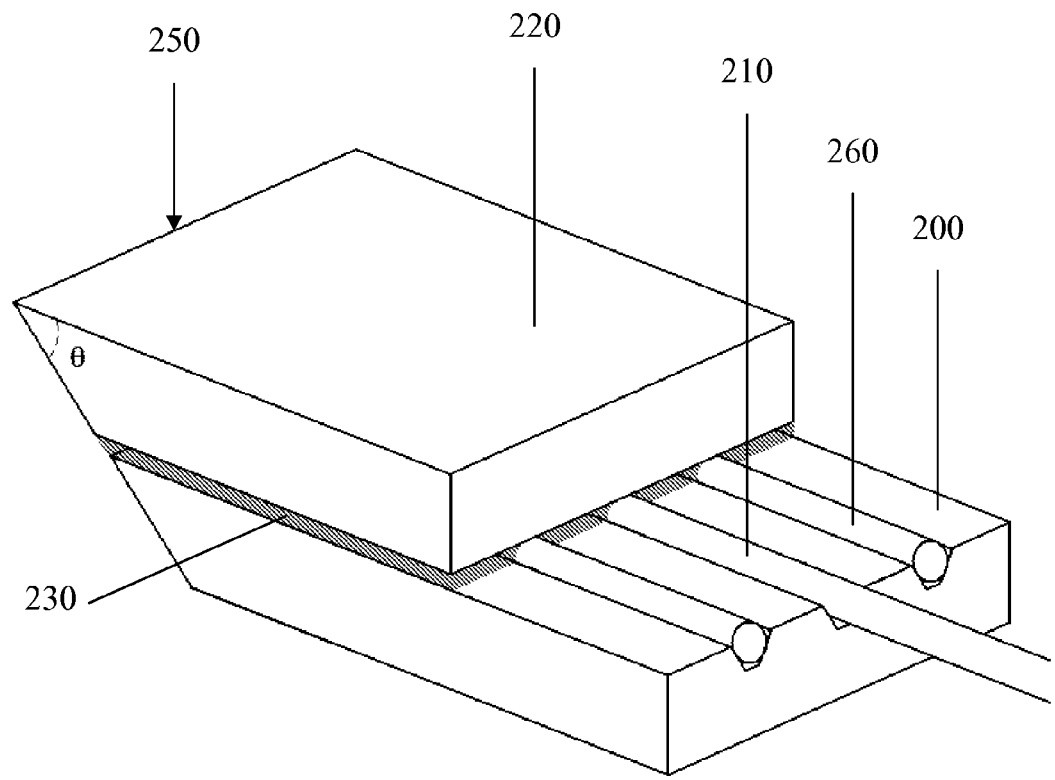
FIG. 3 is a perspective view of Embodiment 1 of the side-coupling optical fiber assembly of this invention.
Figure 4:
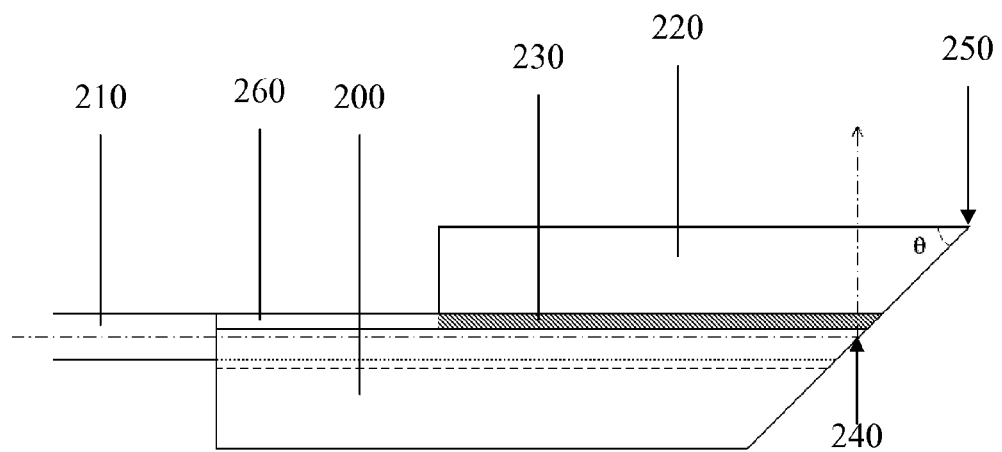
FIG. 4 is a side view of Embodiment 1 of the side-coupling optical fiber assembly of this invention.

Please refer to FIGS. 3 and 4, which illustrate Embodiment 1 of the side-coupling optical fiber assembly of the invention in a perspective and a side view, respectively. The side-coupling optical fiber assembly of the invention comprises: a first substrate 200, an optical fiber 210, and a second substrate 220, wherein the first substrate 200 has at least one groove, the optical fiber 210 is positioned in the groove, and the second substrate 220 is placed above the groove substrate 200 pressing down and covering the optical fiber 210 in the groove. The shape of the groove needs to enable a simultaneous contact of the inserted optical fiber 210 to both the side walls of the groove, and at the same time to expose a certain portion of the fiber above the groove substrate surface in order that the optical fiber can be in contact with the second substrate 220. Under confinements from both the side walls of the groove and the second substrate 220, the optical fiber 210 is completely restricted in the groove. Under general circumstances, the optical fiber 210 here is a naked fiber, whose protective layers such as the outer coating, the plastic sleeve, etc. are removed and internal waveguide fiber exposes. As for the standard single-mode fiber, the internal waveguide fiber material is quartz, and the waveguide fiber diameter is 125 µm.

The second substrate 220 and the first substrate 200 can be fixed together by means of adhesion, for example simply by an ultraviolet adhesive 230 which solidifies under an ultraviolet illumination after dispensed and tightly combines each part. Under a tight connection through the adhesive fixing, the degrees of freedom of the optical fiber 210 in the groove are totally lost. These include translation of the optical fiber 210 along the axial direction of the groove and rotation about its own axis. Hence the position and the status of the fiber end 240 are totally determined by the side-coupling optical fiber assembly.

One important feature of the side-coupling optical fiber assembly of the invention is that the end face 240 of the fiber 210 is made into an inclined facet which meets the total-internal-reflection condition, and thus turns the light traveling along the axial direction of the fiber 210 into a lateral direction at the fiber end. The orientation of this inclined facet is such that the lateral travelling light appears by the side of the second substrate 220. In principle, a light-passing hole or slot can be formed in the second substrate 220 so that the light beam simply passes by the substrate instead of inside through; or, the second substrate can even expose an entire section above the fiber end 240 position. However, due to overflow of the adhesive, there's always an inevitable contamination of the fiber end. A simple and feasible way is to use a same or similar material as that of the waveguide fiber 210 for the second substrate 220, and at the same time to use an adhesive 230 of a refractive index matching that of the waveguide fiber 210 and that of the second substrate 220, together with a low absorption, these materials and products being both actually available, and then to have the second substrate 220 completely press and cover the fiber 210. Since the refractive indexes of all parts are approximate, the light beam travels as if it is in a homogeneous substance and there won't be much internal reflection loss or influence. For the case that the light beam passes through the upper surface of the second substrate 220, it is like the normal axial input or output at an optical fiber end wherein the reflection influence at the fiber end can either be counted or an anti-reflection coating can be applied for reducing the reflection.

The angle θ of the fiber end facet 240 is determined in accordance with the critical angle condition of the total internal reflection at the interface formed by the waveguide fiber material and its surrounding medium. When the incident angle of the light beam in the optical fiber 210 to this end surface is any bit larger than the critical angle, total internal reflection of the light beam will occur at this surface, with no transmitted output. Hence, the value of θ is not unique and can be selected according to some specific need such as output direction, interfacial back-reflection influence, etc. As for the quartz-air interface, the angle θ of the inclined fiber end facet can be set at 42 degrees.

For the invention, the second substrate is an extended optical bench, and at least one optical element can be installed on it. This is another feature of significance of the invention.

Figure 5:
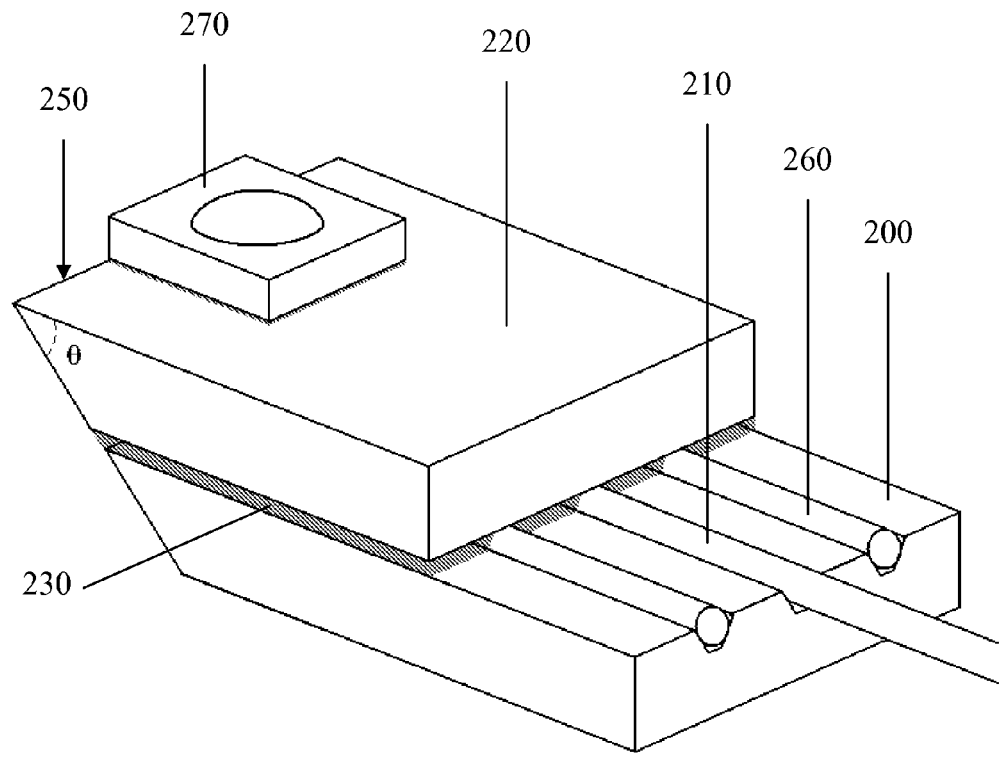
FIG. 5 is a perspective view of Embodiment 2 of the side-coupling optical fiber assembly of this invention.
Figure 6:
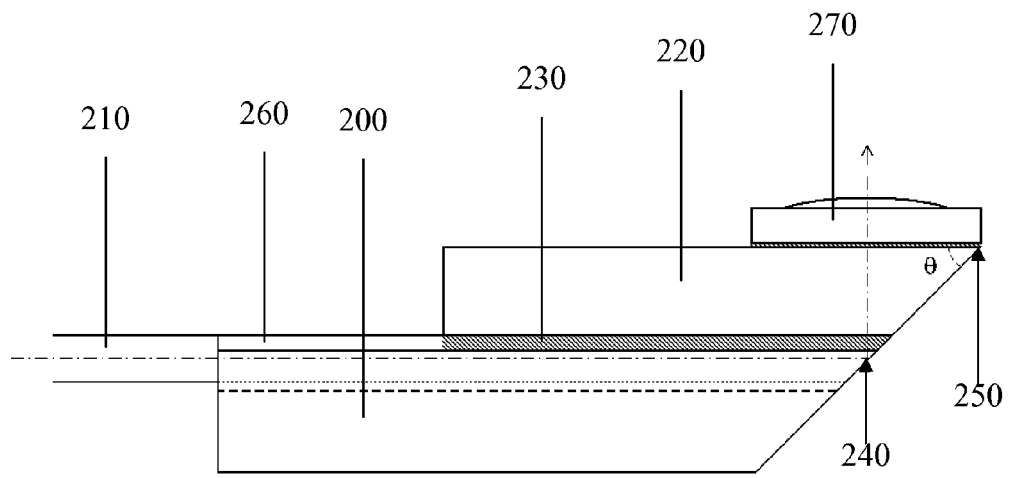
FIG. 6 is a side view of Embodiment 2 of the side-coupling optical fiber assembly of this invention.

Please refer to FIGS. 5 and 6, which illustrate Embodiment 2 of the side-coupling optical fiber assembly of the invention in a perspective and a side view, respectively. The capability of the extension owes to an assembling-platform function that the second substrate 220 can actually provide, in that other optical elements such as lenses, filters, polarizers, reflecting mirrors, etc., can be readily installed and fixed onto it, and some optoelectronic and electronic elements can also be directly installed. In principle, the second substrate 220 provides a function no more different from that of the mounting substrates generally used in installation of various kinds of elements. A microlens 270 is then to be added to the second substrate 220. The microlens is made by semiconductor process, wherein the lens aperture can be made smaller than 1 mm, and the lens curvature is formed by photolithography and chemical etching. This die-like microlens 270 has already been commercially available. The lens materials include quartz and silicon, well suited for transmission of the infrared lightwaves used in the fiber-optic communication. The microlens 270 can be either a single-convex or a double-convex type. In this embodiment the single-convex type is used so that the lens is conveniently and directly installed onto the second substrate 220 by using its planar base side, the installation being simple and easy. An anti-reflection coating can be applied to both the convex and the base side of the microlens 270 when needed, for reduction of the reflection influence. The attachment between the microlens 270 and the second substrate 220 can also be realized through index-matching adhesive 230. In the installation, it is required that the light beam output from the coupling fiber end 240 pass through the effective region of the lens 270, therefore, there exists an issue of accurate alignment of the lens 270 with respect to the central axial point of the fiber end 240. For this purpose, the end edge 250 formed on the upper surface of the second substrate 220 in processing of the inclined end surface can be utilized as an alignment guide. In addition, graphic alignment marks can be designed and formed on the surface area outside the aperture region of the die lens 270 by its semiconductor process. By using the graphic alignment marks, in combination with the alignment guide edge 250, the grooves, and else more as the locating references, the lens positioning can be accurately done. Microlenses 270 with coatings and designated alignment marks can both be supplied from the manufacturers under correspondent customization services.

After addition of the microlens 270, a new, self-contained assembly is formed upon the original optical fiber assembly. The addition of the lens 270 will enhance control of the light transmission outside the optical fiber 210. For instance, the light beam output from the fiber 210 has a nature of being divergent, whereas the lens 270 can act as a converging element. This is very important to high-speed devices in which the diameter of a light-receiving region is very small. For a light-emitting element, such as the semiconductor laser diode used in the optical communication, the emitted beam also has a nature of being divergent, hence the lens can act with the same converging effect. When a lens 270 is included, the thickness of the second substrate 220 becomes an important parameter in controlling the overall optical characteristic of the side-coupling optical fiber assembly.

Figure 7:
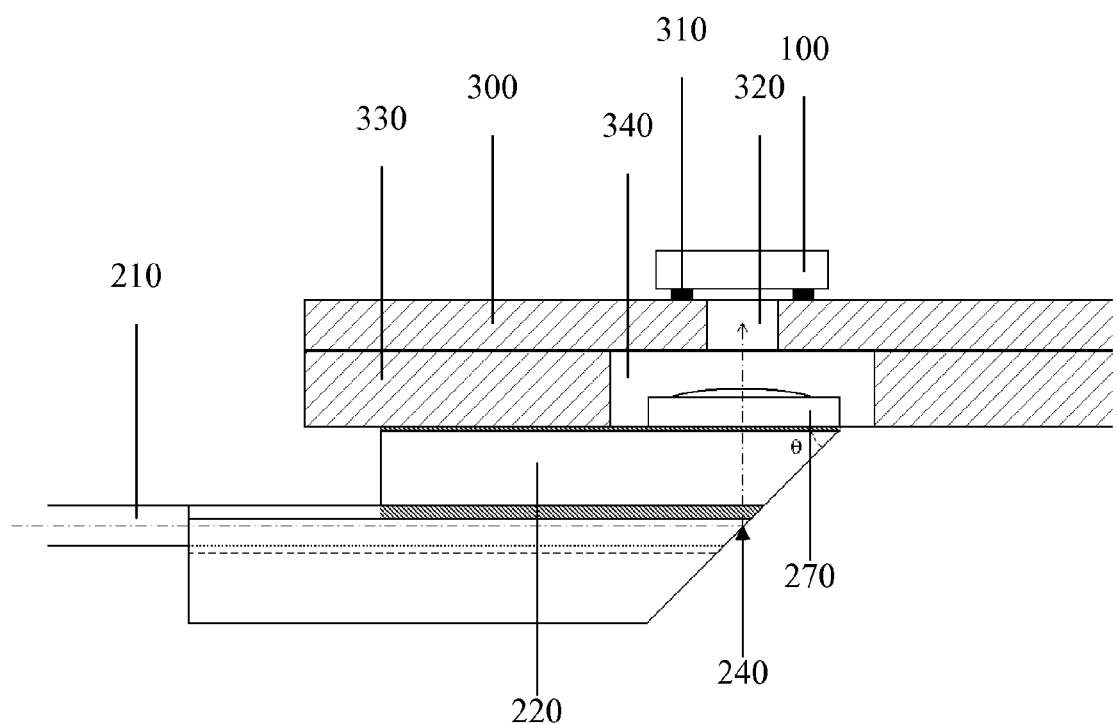
FIG. 7 is a side (and partially cross-sectional) view of Embodiment 3 of the side-coupling optical fiber assembly of this invention.

Please refer to FIG. 7, which illustrates Embodiment 3 of the side-coupling optical fiber assembly of the invention in a side view; it is for fiber packaging of a high-speed optical receiving device in the optical communication, wherein the optical receiving device comprises a surface-type semiconductor optical receiving chip 100 and a mounting substrate 300 of the chip. In order to fulfill the high-speed requirement herein, the flip-chip technology is adopted in the electrical packaging of the optical receiving chip 100, wherein the surface electrode of the optical receiving chip 100 is directly bonded to a microwave transmission circuit on the substrate 300 by solder alloy 310, whereas the working surface of the optical receiving chip 100 for the optical coupling is positioned downward facing toward the substrate 300. A second light-passing hole 320, whose diameter is smaller than the chip 100 size but far larger than the working region diameter of the optical receiving chip of a high-speed application, is set at a corresponding position on the substrate 300. For the case of a 40 Gb/s application, wherein the working region of the optical receiving chip 100 is of a diameter of 12 μm, the second light-passing hole 320 can have a diameter of 200 μm.

As explained above, a die-type microlens 270 can also be added here, which forms a new, extended side-coupling optical fiber assembly. The thickness of the second substrate 220 then decides the distance parameter in the object space of the lens 270. A spacer plate 330 is adhered below to the substrate 300 of the optical receiving chip. A large rectangular hole or slot 340 is formed in the spacer plate 330 in the region corresponding to the second light-passing hole 320. In this way, the upper surface of the second substrate 220 and the lower surface of the spacer plate 330 can be adhered and fixed together with the microlens 270 on the second substrate 220 accommodated in the hole or slot 340 of the spacer plate 330. This fiber-below-chip structure, where the working surface of the optical receiving chip 100 is positioned downward, solves the problem of the prior art that the fiber packaging is difficult to coincide with the flip-chip mounting of the element. And in this embodiment, the spacer plate 330 also controls the distance parameter in the image space of the lens 270.

As in the above embodiment, the fiber packaging is actually dissociated from the package 150 of the photoelectric conversion element. The coupling and fixing processes between the side-coupling optical fiber assembly and the substrate 300 having the optical receiving chip 100 can both be done independently. In manipulation, the substrate 300 with a receiving chip 100 installed can be turned over for the observation and the alignment of the optical fiber coupling, and after being coupled and fixed the substrate 300 and the fiber assembly are placed into the package 150 together. At this moment, the fiber 210 still needs to go through the through-hole 160 in the package 150, however, the fiber fixing into the through-hole now concerns only the airtightness and the mechanical strength of the packaging, no more related to the fiber coupling. Furthermore, movements of the fixed section of the fiber in the through-hole no longer affects the coupling status of the fiber. The freedom of the fiber end 240 is totally restricted by the invented side-coupling optical fiber assembly and the combined mounting substrate 300 of the optoelectronic chip. This direct fiber end fixing solves the problem of poor coupling instability in the prior art, whereas the coupling state in the prior art is easily affected by its fiber fixation in the through-hole 160.

This invention then provides a fabrication method of the side-coupling optical fiber assembly, which comprises the following steps:

an optical fiber is put into a groove on a first substrate;

the first substrate and a second substrate are fixed together by means of adhesion, which makes the fiber lose all its degrees of freedom;

the end face of the optical fiber and the end edge faces of the first and the second substrates are ground or polished into one inclined surface, wherein a total internal reflection of the light beam in the optical fiber takes place at the inclined end facet of the fiber.

In reference to FIG. 4, the fiber end 240 is processed into a required inclined facet with an angle θ and the inclined end facet is strictly positioned in a required orientation relative to the groove. The process begins with putting an unprocessed naked fiber 210 into the groove, and then follows with fixing the second substrate 220, the fiber 210, and the first substrate 200 together by an adhesive 230. After that, the common ends of the three are as a whole ground or polished into an inclined surface at a required angle by using a special processing mould. The grinding or polishing of the three in a whole not only eliminates the need for considering the fiber 210's orientation when it is placed, but also provides an important guide edge 250 formed during the process on the upper surface of the second substrate 220, wherein the guide edge 250 acts as a good alignment reference with respect to the central axial point of the optical fiber end 240. This is due to a fact that the horizontal distance between this guide edge and the central axial point of the fiber end 240 is always a constant that can be calculated. As the size of the waveguide fiber is very small and its material is transparent and uniform, it's hard to determine the precise fiber axis position with naked eyes. Therefore, the existence of this guide edge 250 provides the base for a structural and functional extension of the side-coupling optical fiber assembly of the invention.

In disposition of the second substrate 220, it is important if the upper surface of the substrate is positioned horizontally or not. This concerns the traveling direction of the light beam after it passes through the substrate. Therefore, in addition to the requirement that the upper and lower surfaces of the second substrate 220 have a high level of parallelism, multiple identical grooves can be formed in the first substrate 200 and, identical auxiliary fibers 260 can be put in the grooves, the length of which being limited and matching only that of the grooves. With the auxiliary grooves and fibers, the lower surface of the second substrate 220 can be put in a horizontal position when it is adhered and fixed to the first substrate 200.

The above are only preferred embodiments of the invention, and they are illustrative only, not restrictive. Personnel in the specific technical field understand that many changes, modifications and even equivalences can be made to these embodiments within the spirit and the scope limited by the claims of the invention, but are all within the protection of the invention.

The invention claimed is:

1. A side-coupling optical fiber assembly comprising:
a first substrate having at least one groove formed on one of its surfaces;
an optical fiber arranged in the groove; and
a second substrate arranged above the first substrate such that the second substrate presses and covers the optical fiber, wherein the first and the second substrates are fixed together;
wherein an inclined facet is formed on the fiber end positioned between the first and the second substrates, the inclined facet being for realization of a total internal reflection of the light beam transmitted in the optical fiber, and wherein one end edge facet of each of the first and second substrates is in the same surface of the inclined facet of the optical fiber, wherein the end edge facet of the second substrate extends along the entire edge of the second substrate, and wherein the end edge facet of the second substrate includes an alignment guide edge on the upper surface of the second substrate;

wherein a first light-passing hole is arranged in the second substrate, the first light-passing hole corresponding to the path of the light beam after the light beam is totally reflected from the inclined end facet of the optical fiber, or wherein the second substrate is made of an identical material as that of the waveguide of the optical fiber;

wherein the second substrate is an extended optical bench and at least one optical element is arranged on the second substrate, and alignment of the optical element on the second substrate is based upon the alignment guide edge on the upper surface of the second substrate.

2. The side-coupling optical fiber assembly of claim 1 wherein the optical element arranged on the second substrate is a lens, the transmission region of the lens corresponding to the projection region of the totally reflected light beam.

3. The side-coupling optical fiber assembly of claim 2 further comprising a spacer plate arranged above the second substrate, wherein a slot hole is arranged in the spacer plate and the lens is adapted to the slot hole.

4. The side-coupling optical fiber assembly of claim 3 further comprising:

a mounting substrate for an optical receiving chip, wherein the mounting substrate is arranged above the spacer plate, and wherein a second light-passing hole is arranged in the mounting substrate and corresponds to the projection region of the light beam after the light beam passes through the lens; and an optical receiving chip arranged above the second light-passing hole and combined with the mounting substrate.

5. A method of making a side-coupling optical fiber assembly, the method comprising the steps of:

putting an optical fiber into a groove formed on a first substrate;

fixing a second substrate to the first substrate by means of adhesion such that the optical fiber loses all its degrees of freedom;

grinding or polishing the end face of the optical fiber and the entire end edge faces of the first and the second substrates into one same inclined surface such that a total internal reflection of the light beam in the optical fiber takes place at the formed inclined end facet of the optical fiber, wherein the grinding and polishing forms an inclined end facet of the second substrate, the inclined end facet of the second substrate including an alignment guide edge formed on the upper surface of the second substrate; and arranging at least one optical element on the second substrate with reference to the alignment guide edge of the second substrate so as to attain precise optical alignment between the optical element and the inclined end facet of the fiber.

6. The method of claim 5 further comprising putting into another groove of the first substrate an additional optical fiber having the same diameters as the said optical fiber, so as to ensure that the first substrate and the second substrate will be mutually parallel after they are fixed together.

7. The side-coupling optical fiber assembly of claim 1 wherein an alignment feature of the optical element is vertically aligned with the alignment guide edge.

8. The method of claim 5 wherein the at least one optical element is arranged in such a way that an alignment feature of the at least one optical element is vertically aligned with the alignment guide edge.

* * * * *